US012786300B2

(12) United States Patent
Tong

(10) Patent No.: US 12,786,300 B2
(45) Date of Patent: Nov. 3, 2026

(54) TERMINAL DEVICE

(71) Applicant: Honor Device Co., Ltd., Shenzhen (CN)

(72) Inventor: Yiliang Tong, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 338 days.

(21) Appl. No.: 18/689,618

(22) PCT Filed: Sep. 8, 2023

(86) PCT No.: PCT/CN2023/117844
§ 371 (c)(1),
(2) Date: Mar. 6, 2024

(87) PCT Pub. No.: WO2024/061033
PCT Pub. Date: Mar. 28, 2024

(65) Prior Publication Data

US 2025/0126193 A1 Apr. 17, 2025

(30) Foreign Application Priority Data

Sep. 23, 2022 (CN) ........................ 202211166562.4

(51) Int. Cl.
*H04M 1/02* (2006.01)

(52) U.S. Cl.
CPC ................................ *H04M 1/0277* (2013.01)

(58) Field of Classification Search
CPC .... H04M 1/02; H04M 1/0206; H04M 1/0277; Y02E 60/10
USPC ...................................................... 455/575.1
See application file for complete search history.

(56) References Cited

U.S. PATENT DOCUMENTS

| | | | | |
|---|---|---|---|---|
| 6,591,088 | B1 | 7/2003 | Watanabe | |
| 10,205,223 | B2 * | 2/2019 | Chang .................... | H01Q 1/243 |
| 10,658,732 | B2 * | 5/2020 | Kim ......................... | H01Q 9/30 |
| 2010/0061055 | A1 | 3/2010 | Dabov et al. | |
| 2013/0271943 | A1 | 10/2013 | Iwai | |

(Continued)

FOREIGN PATENT DOCUMENTS

| | | | |
|---|---|---|---|
| CN | 201860536 | U | 6/2011 |
| CN | 202603064 | U | 12/2012 |

(Continued)

*Primary Examiner* — Jean A Gelin
(74) *Attorney, Agent, or Firm* — Leydig, Voit & Mayer, Ltd.

(57) ABSTRACT

This application provides a terminal device, including a housing, a sub-board, a metal bracket, and a fastening part. The housing includes a plurality of fastening holes and a plurality of positioning parts, and the sub-board includes a plurality of positioning holes. The metal bracket includes a plurality of clamping parts and a plurality of mounting holes. The plurality of clamping parts are in a one-to-one correspondence with the plurality of positioning parts. The plurality of fastening holes are in a one-to-one correspondence with the plurality of positioning holes and the plurality of mounting holes. Each clamping part is clamped to one positioning part. The plurality of positioning holes are aligned with the plurality of mounting holes in the Z-axis direction, and the fastening part sequentially passes through the aligned mounting holes, positioning holes, and fastening holes.

16 Claims, 8 Drawing Sheets

(56) References Cited

U.S. PATENT DOCUMENTS

| | | | | |
|---|---|---|---|---|
| 2014/0210675 | A1 | 7/2014 | Hwang et al. | |
| 2016/0072178 | A1* | 3/2016 | Khalifa | H01Q 1/36 343/702 |
| 2017/0033437 | A1* | 2/2017 | Ghit | H01Q 9/0421 |
| 2019/0260116 | A1* | 8/2019 | Wei | H02J 7/02 |
| 2021/0144241 | A1* | 5/2021 | Kim | H04M 1/0266 |
| 2021/0227112 | A1* | 7/2021 | Guo | H04M 1/0264 |
| 2022/0200212 | A1* | 6/2022 | Yi | H01R 13/6594 |
| 2025/0126193 | A1* | 4/2025 | Tong | H04M 1/02 |

FOREIGN PATENT DOCUMENTS

| | | | |
|---|---|---|---|
| CN | 105491195 | A | 4/2016 |
| CN | 107734434 | A | 2/2018 |
| CN | 107819906 | A | 3/2018 |
| CN | 108390969 | A | 8/2018 |
| CN | 207802075 | U | 8/2018 |
| CN | 109391715 | A | 2/2019 |
| CN | 110970248 | A | 4/2020 |
| CN | 212812030 | U | 3/2021 |
| CN | 214070407 | U | 8/2021 |
| CN | 113507813 | A | 10/2021 |
| CN | 113630488 | A | 11/2021 |
| CN | 216357734 | U | 4/2022 |
| CN | 216532188 | U | 5/2022 |
| CN | 217087989 | U | 7/2022 |
| CN | 115250304 | A | 10/2022 |
| GB | 2345818 | A | 7/2000 |
| JP | 2013192598 | A | 9/2013 |
| WO | 2016174835 | A1 | 11/2016 |
| WO | 2022139482 | A1 | 6/2022 |

* cited by examiner

TERMINAL DEVICE

CROSS-REFERENCE TO RELATED APPLICATIONS

This application is a National Stage of International Application No. PCT/CN2023/117844, filed on Sep. 8, 2023, which claims priority to Chinese Patent Application No. 202211166562.4, filed on Sep. 23, 2022, both of which are hereby incorporated by reference in their entireties.

TECHNICAL FIELD

This application relates to the field of terminal device technologies, and in particular, to a terminal device.

BACKGROUND

Terminal devices such as smartphones are widely used in people's daily life and work, and have become indispensable daily articles. Currently, there are increasingly more functions in a mobile phone. Components such as a speaker module and a camera module occupy a large amount of space inside the mobile phone. An increase in a quantity of internal components of the mobile phone inevitably poses a higher requirement on miniaturization of a structural member, such as a circuit board bracket, that supports a bracket and the like. Under a condition of limited space, how to implement miniaturization of a structural member of a bracket is a problem to be resolved.

SUMMARY

This application provides a terminal device, to ensure assembly stability of a bracket while implementing miniaturization of the bracket.

The terminal device in embodiments of this application includes a housing, a circuit board assembly, a metal bracket, and a fastening part, where the circuit board assembly includes a sub-board.

The housing includes a plurality of fastening holes and a plurality of positioning parts, the sub-board includes a plurality of positioning holes, the metal bracket includes a plurality of clamping parts and a plurality of mounting holes, the plurality of clamping parts are distributed at intervals on a periphery of the metal bracket, the plurality of clamping parts are in a one-to-one correspondence with the plurality of positioning parts, and the plurality of fastening holes are in a one-to-one correspondence with the plurality of positioning holes and the plurality of mounting holes.

The sub-board and the metal bracket are sequentially mounted on the housing, and each clamping part is clamped to one positioning part, to pre-position the metal bracket and the housing in a Z-axis direction, so that the plurality of fastening holes are respectively aligned with the plurality of positioning holes in the Z-axis direction, and the plurality of positioning holes are aligned with the plurality of mounting holes in the Z-axis direction; and the fastening part sequentially passes through the aligned mounting holes, positioning holes, and fastening holes to lock the metal bracket, the sub-board, and the middle frame tightly in the Z-axis direction.

The circuit board assembly in the embodiments includes a primary circuit board and a secondary circuit board. The sub-board is the secondary circuit board and has a function of a circuit board. The metal bracket may be directly inserted to be fastened to the housing to implement pre-positioning in the Z-axis direction, and no back adhesive is required, so that assembly efficiency is improved, and detachment is facilitated without damaging the metal bracket. In the conventional technology, a bracket mostly uses a solution in which plastic is combined with a steel sheet, where an X-axis direction and a Y-axis direction are limited by using a middle frame, and a Z-axis direction is limited through cooperation between a plastic buckle and a plastic member of the middle frame. However, a disadvantage of the solution in which the plastic is combined with the steel sheet lies in that a strength requirement of the bracket on the plastic member increases a thickness of the plastic member, and therefore relatively large space is occupied in the Z-axis direction. When internal space of a mobile phone is limited, a whole device is inevitably thickened, and an appearance effect is lost. The bracket in this application is manufactured through metal stamping, which reduces a thickness size to a great extent. The clamping part of the metal bracket and the positioning part of the middle frame are used to position the Z-axis direction to pre-position the metal bracket, and there is no need to use a back adhesive to pre-fasten the metal bracket to the sub-board or a motor through adhering, so as to avoid a case in which the steel bracket cannot be detached and reused because the steel bracket is deformed during maintenance and detachment due to high viscosity of the back adhesive, and avoid a case in which pre-fastening in the Z-axis direction cannot be implemented because the viscosity of the back adhesive is low. The clamping part and the positioning part in the embodiments are located on the periphery of the metal bracket, thereby preventing an edge of the metal bracket from warping or being displaced relative to the sub-board, causing that a lock screw station cannot be automated.

In an embodiment, the housing further includes a mounting groove and a plurality of abutting parts, and the plurality of abutting parts are disposed at intervals along peripheral side wall surfaces of the mounting groove; and the metal bracket includes a plurality of abutting bodies that are in a one-to-one correspondence with the plurality of abutting parts, the plurality of abutting bodies are disposed along the periphery of the metal bracket, and one abutting body is disposed on a side part of each clamping part; and the sub-board and the metal bracket are sequentially mounted in the mounting groove in the Z-axis direction, and each abutting body abuts against one abutting part corresponding to the abutting body, to pre-position the metal bracket and the housing in an X-axis direction and a Y-axis direction.

In this embodiment, the abutting part is designed on an inner side surface of the middle frame serving as the housing and abuts against the abutting body of the metal bracket, to position in the X-axis direction and the Y-axis direction, and after the abutting part and the abutting body are assembled in the Z-axis direction, abutting force is generated in the X-axis direction and the Y-axis direction, and a structure is simple and easy to mount.

In an embodiment, each clamping part includes a first surface facing opposite to the middle of the metal bracket, and each positioning part includes a second surface facing the mounting groove; and the clamping part is clamped to the positioning part, and the first surface abuts against the second surface, to pre-position the metal bracket and the housing in the X-axis direction and the Y-axis direction. In this embodiment, the clamping part can be clamped to the positioning part to pre-position the metal bracket and the housing in the X-axis direction and the Y-axis direction, or pre-position the metal bracket and the housing in the Z-axis direction. A structure is simpler, thereby saving housing space.

In an embodiment, the mounting groove includes a side wall surface, the positioning part is a groove recessed on the side wall surface, and a groove opening of the groove is located on the side wall surface; and the metal bracket includes a body, and the clamping part is an extended sheet that is located at an edge of the body and that extends away from the body. The sheet-like clamping part is clamped to the groove to implement positioning in the Z-axis direction, so that a structure of the metal bracket is simplified and is convenient to process, and no extra space of the housing is occupied.

In an embodiment, the groove includes a first side wall and a second side wall, both the first side wall and the second side wall face inwards the mounting groove, and the first side wall is connected to the side wall surface and inclined relative to the side wall surface.

The clamping part includes a main body and an abutting end, the main body and the abutting end are connected at an angle, the abutting end is inclined in a body direction, the metal bracket is mounted in the mounting groove in the Z-axis direction, the clamping part slides along the side wall surface to be inserted into the positioning part, and the abutting end abuts against the first side wall in the Z-axis direction.

In this embodiment, the abutting end of the clamping part is elastic, and elastic pressure may be generated between the abutting end and the side wall surface during assembly. After the abutting end slides to a groove location, the elastic force is released and the abutting end naturally enters the groove. In addition, the first side wall is an inclined surface, which facilitates abutting of the abutting end. In this embodiment, the metal bracket is assembled with the mounting groove more easily due to a structure of the clamping part.

In an embodiment, the groove includes a first side wall and a second side wall, and the first side wall and the second side wall are disposed parallel and opposite to each other; and the clamping part includes a main body and an abutting end, the main body is located at the edge of the body and is bent and extends in the Z-axis direction, a free end of the main body is bent to form the abutting end in an arc shape, and the abutting end is inclined away from the body direction.

The metal bracket is mounted in the mounting groove in the Z-axis direction, the clamping part slides along the side wall surface to be inserted into the positioning part, and an arc-shaped surface of the abutting end abuts against the first side wall in the Z-axis direction.

In this embodiment, the abutting end of the clamping part is elastic, and elastic pressure may be generated between the abutting end and the side wall surface during assembly. After the abutting end slides to a groove location, the elastic force is released and the abutting end naturally enters the groove, and abutting force is generated between the abutting end and the first side wall in the Z-axis direction, thereby improving assembly stability. In this embodiment, the metal bracket is assembled with the mounting groove more easily due to a structure of the clamping part.

In an embodiment, the housing includes a middle frame and an outer housing of an electronic component, the outer housing of the electronic component is mounted in the mounting groove, the mounting groove is disposed in the middle frame, and the mounting groove includes a first side wall surface; the plurality of positioning parts include a first positioning part and a second positioning part; the first positioning part is disposed on the first side wall surface, and a groove opening of the first positioning part faces the Y-axis direction; the second positioning part is disposed on a surface that is of the outer housing and that faces inwards the mounting groove, and a groove opening of the second positioning part faces the X-axis direction; and the surface that is of the outer housing and that faces inwards the mounting groove is connected to the first side wall surface.

In this embodiment, the first positioning part and the second positioning part are located in the Y-axis direction and the X-axis direction. Specifically, the groove opening of the first positioning part faces the positive direction of the Y axis, and the groove opening of the second positioning part faces a negative direction of an X axis. This is because displacement in the Z-axis direction needs to be limited. The first positioning part and the second positioning part are disposed in the two directions to facilitate assembly of the metal bracket and the mounting groove.

In an embodiment, the plurality of positioning parts include a third positioning part, and the third positioning part and the second positioning part are disposed in a staggered manner in the X-axis direction; and the mounting groove includes a second side wall surface, and the second side wall surface is connected to the first side wall surface and is disposed opposite to the surface that is of the outer housing and that faces inwards the mounting groove.

An arc-shaped convex part is disposed on the second side wall surface, the third positioning part is disposed on an arc-shaped surface of the convex part, the third positioning part includes a groove opening located on the arc-shaped surface and end openings located on surfaces on two opposite sides of the groove opening, the groove opening faces the Y-axis direction, and the two end openings are arranged in the X-axis direction. The third positioning part in this embodiment is a groove with a plurality of openings, and limits a location in only the Z-axis direction. When the first positioning part and the second positioning part are assembled with the first clamping part and the second clamping part in the plurality of clamping parts, the groove openings of the third positioning part facilitate clamping of the third clamping part with the third positioning part as the first clamping part and the second clamping part are assembled. The clamping parts do not affect each other, and the metal bracket is not bent or deformed.

In an embodiment, a first punching section, a second punching section, a third punching section, and a fourth punching section are disposed on the body, and the plurality of clamping parts include a first clamping part, a second clamping part, and a third clamping part; and the first clamping part is clamped to the first positioning part, the second clamping part is clamped to the second positioning part, and the third clamping part is clamped to the third positioning part.

The first punching section, the second punching section, the third punching section, and the fourth punching section are located at edges of four corner locations of the body that are disposed at intervals, the first clamping part extends from an edge of the first punching section to the Y-axis direction, the second clamping part extends from an edge of the second punching section to the X-axis direction, and the third clamping part extends from an edge of the third punching section to the Y-axis direction.

In an embodiment, the plurality of mounting holes include a first mounting hole, a second mounting hole, a third mounting hole, and a fourth mounting hole, and the first mounting hole, the second mounting hole, the third mounting hole, and the fourth mounting hole are respectively provided on and penetrate through the first punching section, the second punching section, the third punching section, and the fourth punching section in the Z-axis direction.

In this embodiment, the metal bracket and the housing may be fastened by using the fastening part through the first mounting hole, the second mounting hole, the third mounting hole, and the fourth mounting hole, and locations of the four mounting holes may ensure fastening stability of the metal bracket and prevent an edge of the metal bracket from warping. In addition, the mounting holes are adjacent to the first clamping part, the second clamping part, and the third clamping part, and the clamping parts implement pre-positioning and are close to the mounting holes, thereby improving positioning accuracy of the mounting holes.

In an embodiment, the plurality of abutting bodies include a first abutting body, a second abutting body, a third abutting body, and a fourth abutting body, the plurality of clamping parts include a first clamping part, a second clamping part, and a third clamping part, the first abutting body is disposed adjacent to the first clamping part, the second abutting body is disposed adjacent to the second clamping part, the third abutting body is disposed adjacent to the third clamping part, and the fourth abutting body is disposed adjacent to the second abutting body.

The first abutting body and the second abutting body abut against, in the Y-axis direction, the abutting parts corresponding to the first abutting body and the second abutting body, and the third abutting body and the fourth abutting body abut against, in the X-axis direction, the abutting parts corresponding to the third abutting body and the fourth abutting body. In an embodiment, the plurality of abutting bodies are flange structures or end surfaces at edges of the metal bracket. Structures of the abutting body and the abutting part in this embodiment are simple and easy to mount, and no extra housing space is occupied.

BRIEF DESCRIPTION OF DRAWINGS

To describe the technical solutions in embodiments of this application more clearly, the following describes accompanying drawings required in embodiments of this application.

DESCRIPTION OF EMBODIMENTS

The following clearly describes technical solutions in embodiments of this application with reference to the accompanying drawings in the embodiments of this application.

Figure 1:
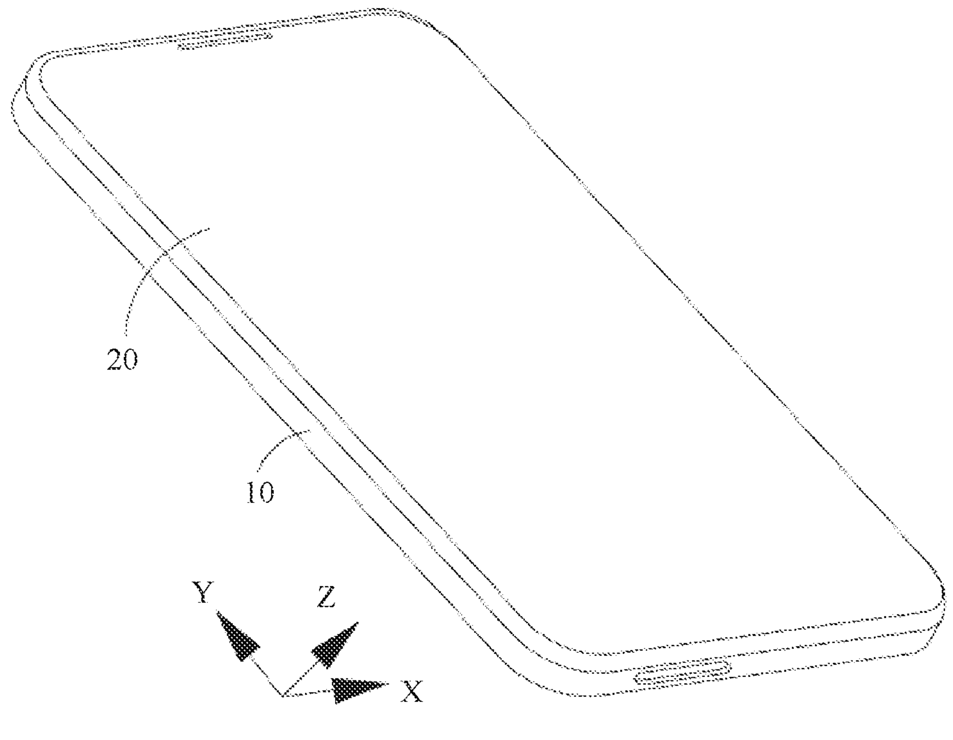
FIG. 1 is a schematic diagram of a structure of a terminal device according to an embodiment of this application.
Figure 2:
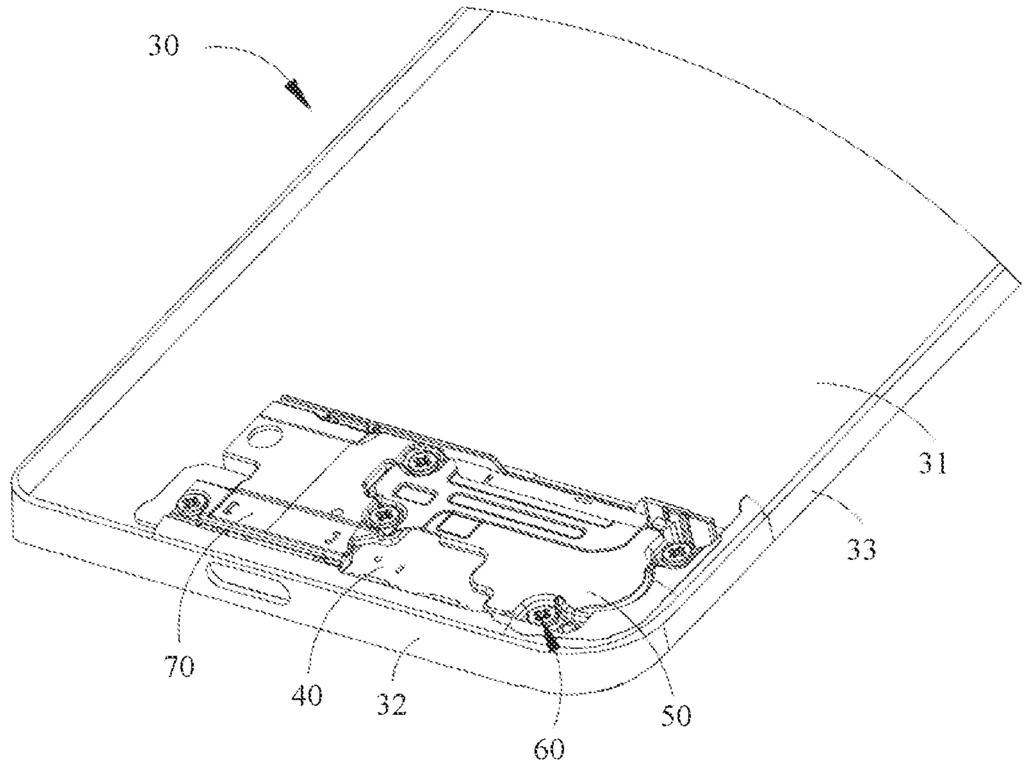
FIG. 2 is a schematic diagram of a structure of a partial main body of the terminal device shown in FIG. 1.

Refer to FIG. 1 and FIG. 2. FIG. 1 is a schematic diagram of a structure of a terminal device 1000 according to an embodiment of this application, and FIG. 2 is a schematic diagram of a structure of a partial main body of the terminal device 1000 shown in FIG. 1.

The terminal device 1000 may be an electronic product such as a mobile phone, a tablet computer, a notebook computer, an in-vehicle infotainment system, a smartwatch, or a smart band. In this embodiment of this application, an example in which the terminal device 1000 is a mobile phone is used for description. For ease of description, a width direction of the terminal device 1000 is defined as an X-axis direction, a length direction of the terminal device 1000 is defined as a Y-axis direction, and a thickness direction of the terminal device 1000 is defined as a Z-axis direction. Every two of the X-axis direction, the Y-axis direction, and the Z-axis direction are perpendicular to each other. It should be noted that, orientation words such as "top", "bottom", "up", "down", "left", and "right" in this application are described with reference to orientations shown in FIG. 1. A direction facing a positive direction of a Y axis is "top", a direction facing a negative direction of the Y axis is "bottom", a direction facing a positive direction of a Z axis is "up", a direction facing a negative direction of the Z axis is "down", a direction facing a positive direction of an X axis is "right", and a direction facing a negative direction of the X axis is "left". The orientation words do not indicate or imply that the indicated apparatus or element needs to have a particular orientation or be constructed and operated in a particular orientation, and therefore should not be understood as a limitation on this application.

Figure 3:
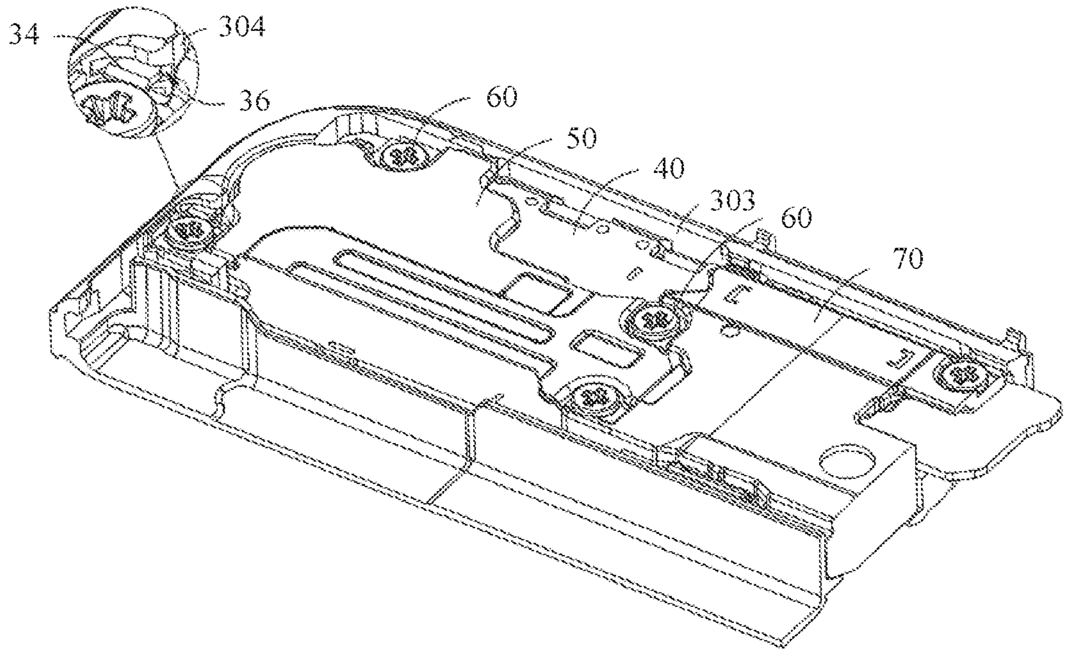
FIG. 3 is a schematic diagram of a partial structure of the partial main body shown in FIG. 2.
Figure 4:
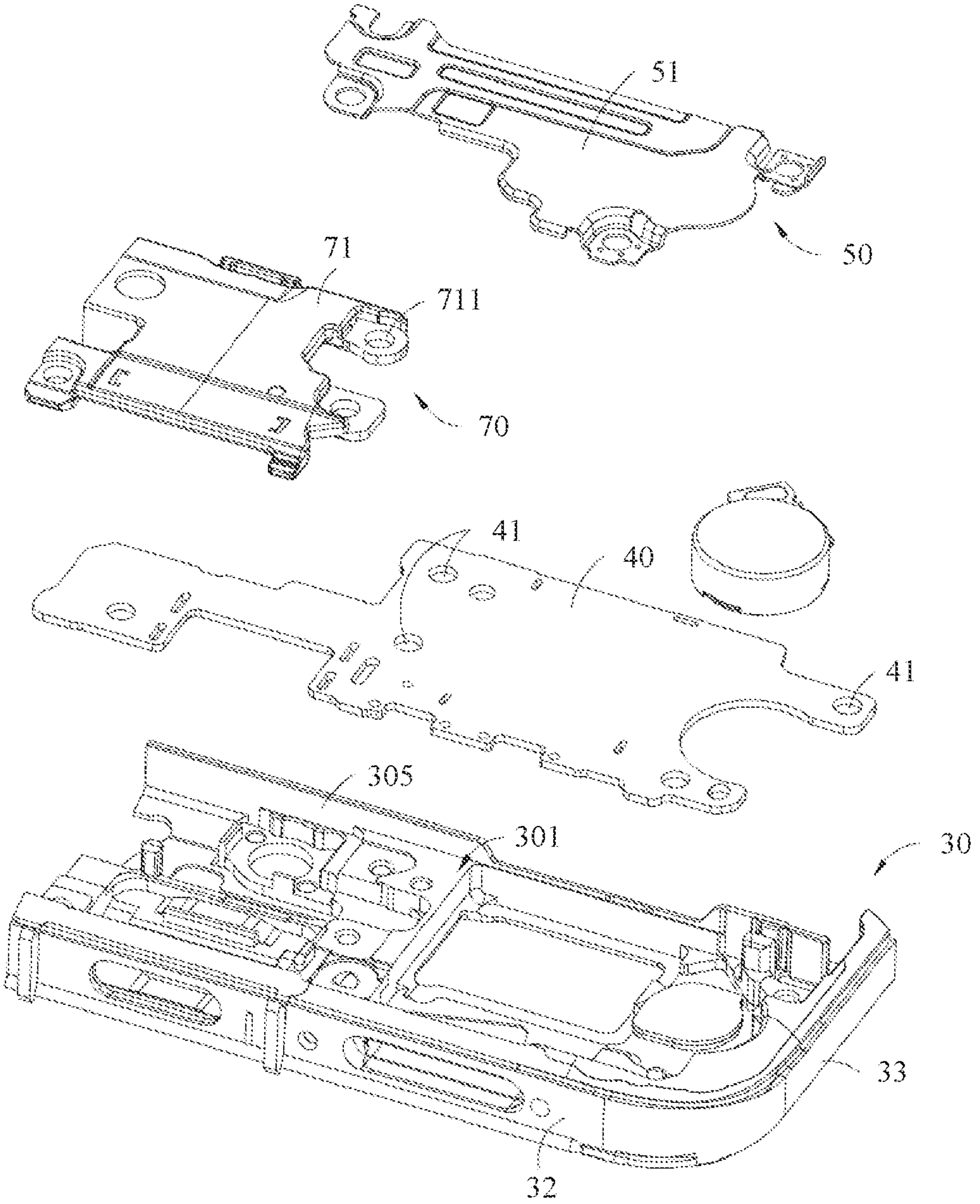
FIG. 4 is a schematic diagram of an exploded structure of the structure shown in FIG. 3.

Refer to FIG. 3 and FIG. 4. FIG. 3 is a schematic diagram of a partial structure of the partial main body shown in FIG. 2, and FIG. 4 is a schematic diagram of an exploded structure of the structure shown in FIG. 3. The terminal device 1000 includes a main body 10 and a screen 20, and the screen 20 is mounted on one side of the main body 10. In this embodiment, the screen 20 may be a display such as an LCD (liquid crystal display) or an OLED (organic light-emitting diode), and is configured to display information such as an image or a text.

The main body 10 includes a rear housing (not marked in the figure), a middle frame 30, a circuit board assembly (not shown in the figure), a bracket assembly, a processor (not shown in the figure), a camera module (not shown in the figure), a speaker module (not shown in the figure), and a power module (not shown in the figure). The rear housing is mounted on the middle frame 30, and the rear housing and the screen 20 are located on two opposite sides of the middle frame 30. The circuit board assembly, the bracket assembly, the processor, the camera module, the speaker module, and the power module are mounted on the middle frame 30. The processor may be mounted on a circuit board, and the processor may be a CPU (central processing unit) of the terminal device 1000. On one side of the rear housing or on one side of the screen 20, for example, the camera module may include a rear camera located on the rear housing and a front camera located at one end of the screen, and the power module is located between the rear housing and the middle frame 30. The circuit board assembly is supported in the middle frame through the bracket assembly. The main body 10 further includes a circuit and a functional electronic component that are disposed on the circuit board, and also includes an antenna. It may be understood that, in addition to the display screen, the main body 10 includes other components that can implement a function of a mobile phone. Certainly, it is not ruled out that some components are directly integrated with the display screen. The speaker module includes speaker units located at a top and a bottom of the terminal device 1000, to implement functions of an earpiece and a speaker of the terminal device 1000.

The middle frame 30 includes a middle plate 31, two end frames 32, and two side frames 33, and the middle plate 31 includes a first surface (not marked in the figure) and a second surface (not marked in the figure) disposed opposite to the first surface. The two end frames 32 and the two side frames are connected head-to-tail and both are connected to side parts of the middle plate 31. The two end frames 32 and the two side frames surround a periphery of the middle plate 31 to respectively form accommodating grooves with the first surface and the second surface of the middle plate 31, to accommodate components of the main body 10 such as the power module, a circuit board bracket, the circuit board assembly, and the speaker assembly. The middle plate 31 in this embodiment is a rectangular plate. The two end frames 32 located at end edges of the middle plate 31 may be considered as a top outer housing and a bottom outer housing of the terminal device, and are usually configured to dispose a sound output hole and a connector plug. The side frames located on two opposite sides of the middle plate may be considered as two side outer housings of the terminal device. A volume button, a power on/off button, or the like may be disposed on the housing, and the housing is also a part held by a user.

The circuit board assembly includes a primary circuit board (not shown in the figure) and a sub-board 40, the middle frame 30 further includes a mounting groove 301, and the bracket assembly includes a metal bracket 50. The sub-board 40 is a printed circuit board, and has a conducting function of the circuit board and a function of disposing an electronic component. The sub-board 40 includes a plurality of positioning holes 41, and the positioning holes 41 are configured to pass by fastening screws on the sub-board 40 and the middle frame. The circuit board is a main board of the terminal device, and is configured to dispose electronic components such as the processor, and implement electrical connection between functional components.

The sub-board 40 is disposed at a bottom of the terminal device, so that electronic components such as a speaker unit, a connector, a motor, or an antenna on a bottom wall are electrically connected. The sub-board 40 and the metal bracket 50 are sequentially stacked on the middle frame 30. Specifically, the sub-board 40 is mounted in the mounting groove 13, and the metal bracket 50 and the middle plate 31 of the middle frame 30 are fastened by using a fastening part 60, that is, the metal bracket 50 and the middle plate 31 clamp and fasten the sub-board 40 in a thickness direction (a Z-axis direction) of the terminal device, where the fastening part 60 may be a screw.

The speaker module includes a speaker unit 70, and the speaker unit 70 is located at a bottom of the main body 10 and used as a speaker. In this embodiment, the speaker unit 70 includes an outer housing 71, and the speaker unit 70 is located on one side of the mounting groove 13 and is fastened, by using the outer housing 71, to the middle plate located in the mounting groove 301. The outer housing 71 is provided with a through hole 711, and the through hole 711 corresponds to a part of the positioning holes of the sub-board 40. The speaker unit 70 in this embodiment is mounted on the middle frame 30, and the outer housing 71 and the middle frame 30 may be collectively referred to as a housing. A module of the speaker unit is mounted on the housing (outer housing), and the foregoing other components of the terminal device are mounted on the middle frame 30.

Figure 5:
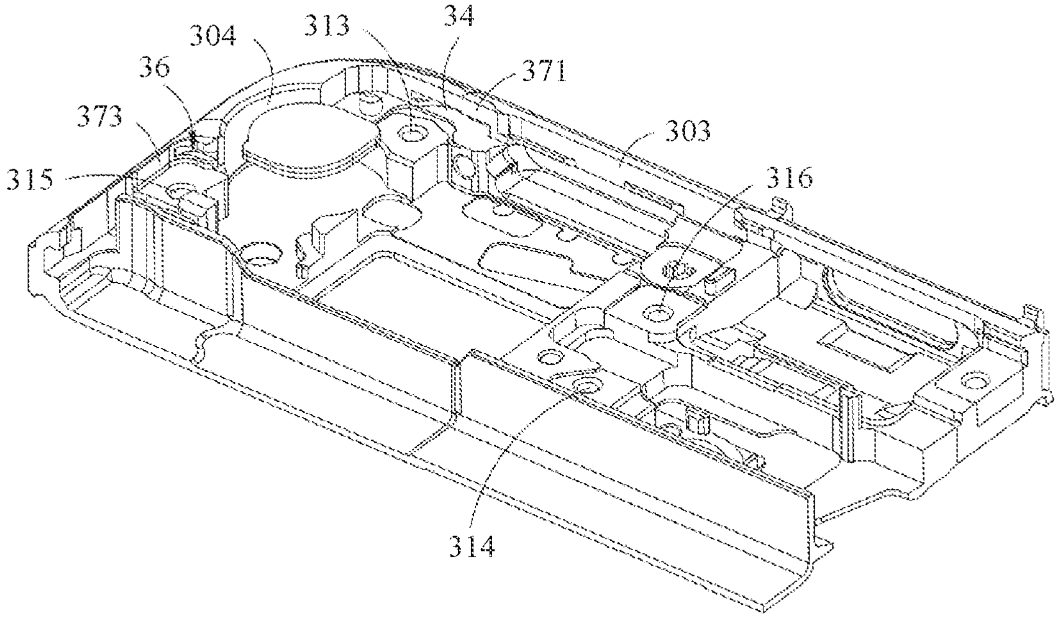
FIG. 5 is a schematic diagram of a structure from a perspective of a middle frame shown in FIG. 4.
Figure 6:
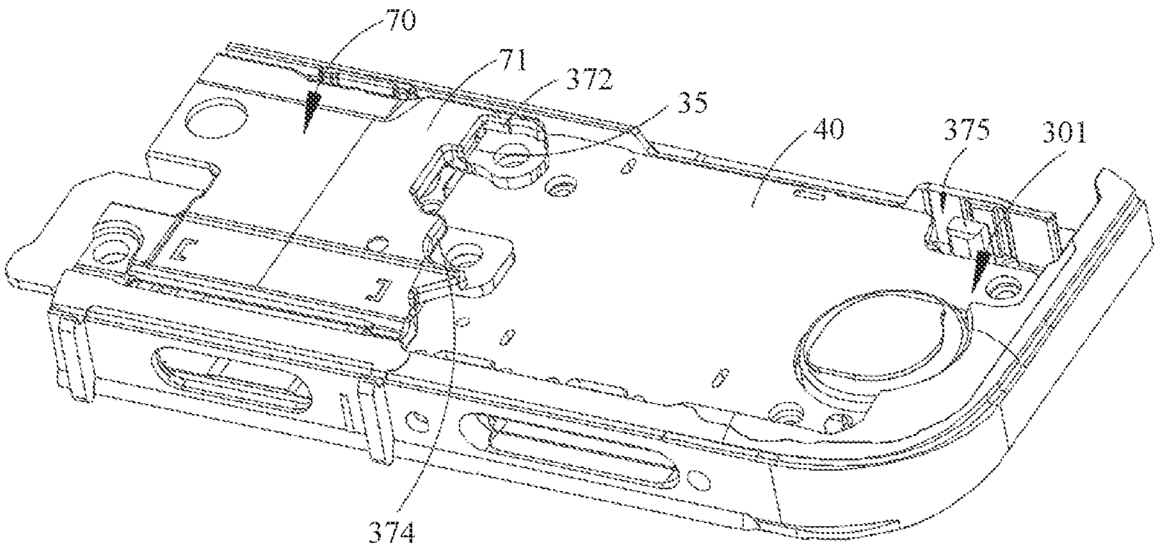
FIG. 6 is an assembly diagram of a partial structure of a main body shown in FIG. 4.

Refer to FIG. 5 and FIG. 6 together. FIG. 5 is a schematic diagram of a structure from a perspective of a middle frame shown in FIG. 4, and FIG. 6 is an assembly diagram of a partial structural of a main body shown in FIG. 4. The mounting groove 301 includes a bottom wall (not marked in the figure), a first side wall surface 303, a second side wall surface 304, and a third side wall surface 305. The first side wall surface 303, the second side wall surface 304, and the third side wall surface 305 are connected at an edge of the bottom wall. The first side wall surface 303 is connected to the second side wall surface 304 and is disposed opposite to the third side wall surface 305. The first side wall surface 303, the second side wall surface 304, and the third side wall surface 305 may be referred to as peripheral side wall surfaces of the mounting groove 301.

Actually, the first side wall surface 303 is an inner surface of the end frame 32, the second side wall surface 304 is an inner surface of the side frame 33, and the bottom wall is a part of the middle plate 31. In addition, the end frame 32 and the side frame 33 in this embodiment are formed integrally with metal and plastic. A surface located inside the mounting groove 301 is a surface of a plastic member, and a surface located outside the middle frame is a metal member. In other words, the first side wall surface 303 and the second side wall surface 304 are surfaces of the plastic member. The third side wall surface 305 may be a baffle wall disposed protruding from the middle plate 31, and is configured to bear the sub-board 40 or another component. It may be understood that, the mounting groove is surrounded by the end frame 32, the side frame 33, the baffle wall disposed protruding from the middle plate 31, and a part of the middle plate 31. It should be noted that, a first surface of the middle plate 31 in the mounting groove 301 is not a flat surface, and has a protrusion with a supporting function and a concave part with a fastening function. The first side wall surface 303, the second side wall surface 304, and the third side wall surface 305 are not all flat surfaces.

The housing includes a plurality of positioning parts (not marked in the figure) and a plurality of abutting parts (not marked in the figure). The plurality of positioning parts and the plurality of abutting parts may be disposed on the middle plate 31, the end frame 32, and the side frame 33; or may be partially disposed on an outer housing of an electronic component, for example, on an outer housing of the speaker unit 70.

In this embodiment, the plurality of positioning parts include a first positioning part 34, a second positioning part 35, and a third positioning part 36. In this embodiment, the first positioning part 34 and the third positioning part 36 are respectively disposed on the first side wall surface 303 and the second side wall surface 304, the second positioning part

35 is disposed on the outer housing of the electronic component, and the plurality of abutting parts are disposed on the first side wall surface 303, the second side wall surface 304, and the outer housing of the electronic component. The first positioning part 34, the second positioning part 35, and the third positioning part 36 may be grooves or may be buckles; or the first positioning part 34, the second positioning part 35, and the third positioning part 36 are combinations of grooves or buckles in any form. For example, the first positioning part 34 and the second positioning part 35 are grooves, and the third positioning part 36 is a buckle.

Specifically, the first positioning part 34, the second positioning part 35, and the third positioning part 36 in this embodiment are all grooves. The first positioning part 34 is recessed on the first side wall surface 303, and a groove opening of the first positioning part 34 is located on the first side wall surface 303, and faces a positive direction of a Y axis, that is, a first direction. The first positioning part 34 in this embodiment is close to a location connecting the first side wall surface 303 and the second side wall surface 304.

The second positioning part 35 is recessed on a surface of the outer housing 71 of the speaker unit 70, as shown in FIG. 6. Specifically, the speaker unit 70 is located on one side of the mounting groove 301 of the middle frame 30, and the outer housing 71 is fixedly connected to the middle plate 31 by using a screw. An opening of the second positioning part 35 is located on a surface that is of the outer housing 71 of the speaker unit 70 and that faces a surface inside the mounting groove 301, that is, located in an X-axis direction, that is, a second direction. In this embodiment, some of the positioning parts are disposed directly by using the outer housing of the electronic component, so that an extra bearing part that cooperates with the metal bracket can be prevented from being disposed on the middle frame, thereby simplifying a structure of the middle frame and saving internal space of the housing.

The third positioning part 36 is disposed on the second side wall surface 304, and is specifically an arc-shaped convex part on the second side wall surface 304. A groove opening located on an arc-shaped surface faces the positive direction of the Y-axis, and both the positive direction and a negative direction of the Y axis are the first direction. The third positioning part 36 is a through groove with a side opening, and in addition to the original groove opening at the arc-shaped location on the second side wall surface 304, end openings located on two opposite sides of the groove opening are disposed in the approximate X-axis direction. In other words, the third positioning part 36 has only two opposite groove side walls, which helps simultaneously mount the metal bracket from the X-axis direction and the Y-axis direction. The third positioning part 36 in this embodiment extends in a curved shape in the X-axis direction. The third positioning part 36 is and the first positioning part 34 are disposed in a staggered manner in the Y-axis direction, and the third positioning part 36 and the second positioning part 35 are disposed in a staggered manner in the X-axis direction.

The middle frame 30 further includes a plurality of fastening holes, and the plurality of fastening holes are used to correspond to the plurality of positioning holes. In this embodiment, the middle frame 30 includes a first fastening hole 313, a second fastening hole 314, a third fastening hole 315, and a fourth fastening hole 316, which are configured to fasten fastening parts (e.g., screws) 60 of the sub-board 40 through screwing. The first fastening hole 313, the second fastening hole 314, the third fastening hole 315, and the fourth fastening hole 316 respectively correspond to four positioning holes 41. The first fastening hole 313, the second fastening hole 314, the third fastening hole 315, and the fourth fastening hole 316 are all recessed on the middle plate 31, and the first fastening hole 313, the second fastening hole 314, the third fastening hole 315, and the fourth fastening hole 316 are approximately at four corner locations on the bottom wall of the quadrilateral mounting groove 301. The first fastening hole 313, the second fastening hole 314, and the third fastening hole 315 are respectively disposed adjacent to the first positioning part 34, the second positioning part 35, and the third positioning part 36, and the fourth fastening hole 316 is close to the second positioning part 35. The second fastening hole 314 and the fourth fastening hole 316 are arranged in the Y-axis direction, and may be located in a straight line or may be disposed in a staggered manner. The first fastening hole 313 and the third fastening hole 315 are located on the other side of the mounting groove 301 and are arranged in the Y-axis direction, and may be located in a straight line or may be disposed in a staggered manner.

The plurality of abutting parts are disposed on the first side wall surface 303, the second side wall surface 304, and a partial surface that is of the outer housing 71 and that faces inwards the mounting groove 301, or may be concave parts. Specifically, the plurality of abutting parts in this embodiment are all flat surfaces, and specifically include a first abutting part 371, a second abutting part 372, a third abutting part 373, a fourth abutting part 374, and a fifth abutting part 375. The first abutting part 371 is a part of the first side wall surface 303, and is adjacent to the first positioning part 34. The second abutting part 372 is a partial surface of the outer housing 71 and is disposed adjacent to the second positioning part 35. The third abutting part 373 is a partial surface of the second side wall surface 304 and is disposed adjacent to the third fastening hole 315. The fourth abutting part 374 is disposed adjacent to the fourth fastening hole 316 and is a partial surface of the outer housing 71. The fifth abutting part 375 is the third side wall surface 305 and is disposed adjacent to the third abutting part 373 in the X-axis direction at intervals. The fifth abutting part 375 and the first fastening hole 313 are disposed in a staggered manner on the Y axis.

Figure 7:
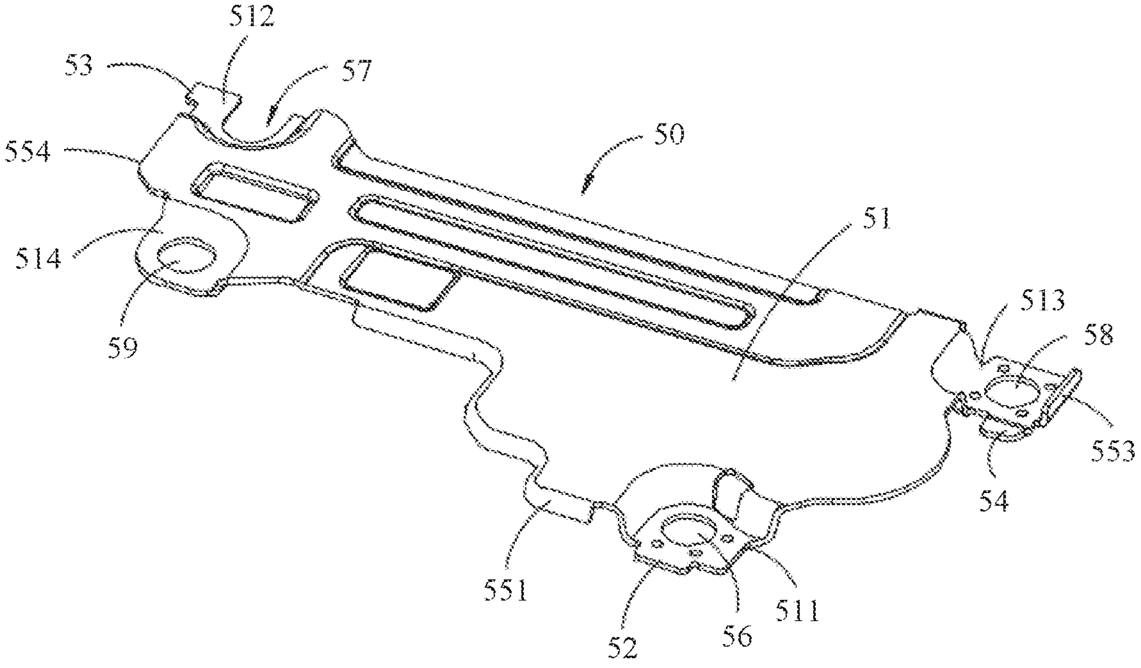
FIG. 7 is a schematic diagram of a structure from a perspective of a sub-board shown in FIG. 4.
Figure 8:
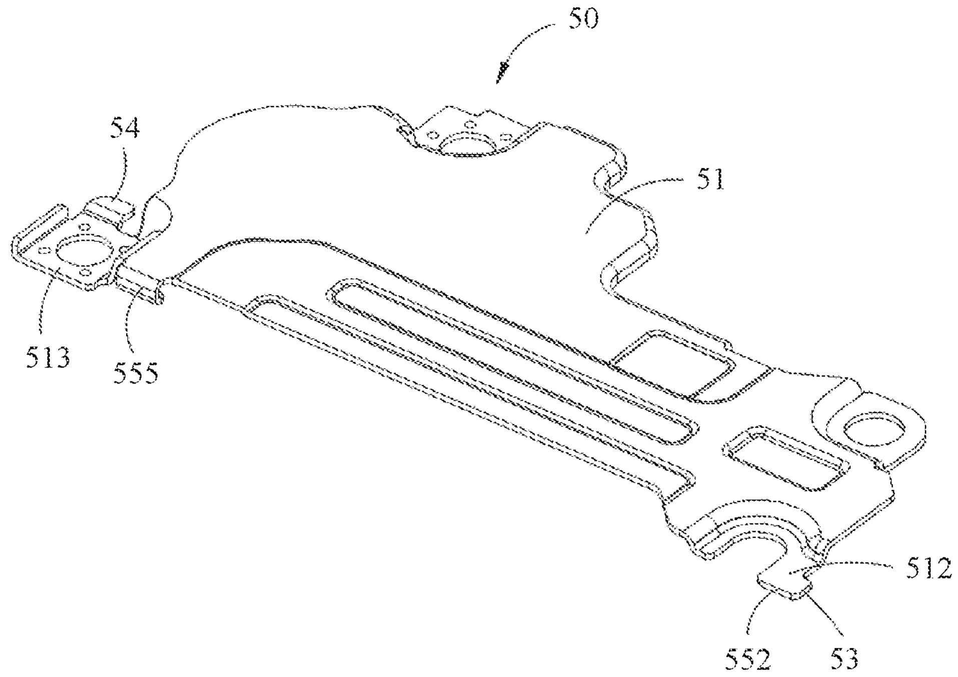
FIG. 8 is a schematic diagram of a structure from another perspective of a sub-board shown in FIG. 4.

Refer to FIG. 7 and FIG. 8. FIG. 7 is a schematic diagram of a structure from a perspective of a sub-board shown in FIG. 4, and FIG. 8 is a schematic diagram of a structure from another perspective of a sub-board shown in FIG. 4.

In this embodiment, the metal bracket 50 is formed by stamping metal materials, and includes a body 51, a plurality of clamping parts, a plurality of mounting holes (not marked in the figure), and a plurality of abutting bodies (not marked in the figure). In this embodiment, the plurality of clamping parts include a first clamping part 52, a second clamping part 53, and a third clamping part 54. The plurality of mounting holes include a first mounting hole 56, a second mounting hole 57, a third mounting hole 58, and a fourth mounting hole 59. The first mounting hole 56, the second mounting hole 57, the third mounting hole 58, and the fourth mounting hole 59 penetrate through the body 51 in a thickness direction of the metal bracket 50. Locations of the first mounting hole 56, the second mounting hole 57, the third mounting hole 58, and the fourth mounting hole 59 respectively correspond to the first fastening hole 313, the second fastening hole 314, the third fastening hole 315, and the fourth fastening hole 316, and are configured to pass through by a screw for screwing.

The body 51 is approximately a quadrilateral thin plate. Compared with a bracket integrally formed by a plastic member and a metal member in the conventional technology, the plastic member may be omitted. In this way, a thickness of the metal bracket 50 is smaller, and thickness space occupied in the terminal device is reduced. The first mounting hole 56, the second mounting hole 57, the third mounting hole 58, and the fourth mounting hole 59 are approximately at four corner locations of the body 51. The first clamping part 52, the second clamping part 53, and the third clamping part 54 are respectively disposed adjacent to the first mounting hole 56, the second mounting hole 57, and the third mounting hole 58. Because a hardness coefficient of a metal sheet is relatively low, when a screw is used to fasten the metal sheet to the middle frame through screwing, the metal sheet is prone to displacement or warping and deformation, which affects precision of assembling the metal bracket 50, the sub-board 40, and the middle frame 30. Therefore, the clamping part and the abutting body are disposed on the metal bracket 50 in this application to cooperate with the middle frame to implement pre-positioning in three directions: the X-axis direction, the Y-axis direction, and the Z-axis direction, so as to pre-position the metal bracket 50 and the sub-board 40 to ensure screwing precision.

Specifically, the first clamping part 52, the second clamping part 53, and the third clamping part 54 may be extended sheets or may be buckles, provided that the first clamping part 52, the second clamping part 53, and the third clamping part 54 can be clamped to the first positioning part 34, the second positioning part 35, and the third positioning part 36. In this embodiment, the first clamping part 52, the second clamping part 53, and the third clamping part 54 are all extended sheets. The body 51 is provided with a first punching section 511, a second punching section 512, a third punching section 513, and a fourth punching section 514. The first punching section 511, the second punching section 512, the third punching section 513, and the fourth punching section 514 are approximately at four corner locations of the body 51 that are disposed at intervals. In this embodiment, it is equivalent to that the body has four corners. In a thickness direction, the first punching section 511, the second punching section 512, the third punching section 513, and the fourth punching section 514 each are on a surface different from that of another location. For example, in the positive direction of the Z axis, the first punching section 511, the second punching section 512, the third punching section 513, and the fourth punching section 514 are lower than another location of the body 51.

The first mounting hole 56, the second mounting hole 57, the third mounting hole 58, and the fourth mounting hole 59 are respectively provided on the first punching section 511, the second punching section 512, the third punching section 513, and the fourth punching section 514. Any "respectively" described above refers to a one-to-one correspondence. For example, that the first mounting hole 56, the second mounting hole 57, the third mounting hole 58, and the fourth mounting hole 59 are respectively provided on the first punching section 511, the second punching section 512, the third punching section 513, and the fourth punching section 514 means the following: The first mounting hole 56 is provided on the first punching section 511, the second mounting hole 57 is provided on the second punching section 512, the third mounting hole 58 is provided on the third punching section 513, and the fourth mounting hole 59 is provided on the fourth punching section 514. The first clamping part 52 extends from an edge of the first punching section 511 to the Y-axis direction, the second clamping part 53 extends from an edge of the second punching section 512 to the X-axis direction, and the third clamping part 54 extends from an edge of the third punching section 513 to the Y-axis direction.

The plurality of abutting bodies include a first abutting body 551, a second abutting body 552, a third abutting body 553, a fourth abutting body 554, and a fifth abutting body 555. The first abutting body 551, the second abutting body 552, and the third abutting body 553 are respectively disposed adjacent to the first mounting hole 56, the second mounting hole 57, and the third mounting hole 58. Specifically, the third abutting body 553 and the fifth abutting body 555 are flange structures, that is, formed by bending edges of the body 51 on one side of the third punching section 513 and the third punching section 513 towards the Z-axis direction. The first abutting body 551 is a flange structure, that is, formed by bending a side edge of the body 51 towards the Z-axis direction. The second abutting body 552 is an end surface that is of the second punching section 512 and that faces the Y axis, and the fourth abutting body 554 is an end surface that is of the fourth punching section 514 and that faces the negative direction of the X axis. In some embodiments, a quantity of the plurality of abutting bodies is not limited, and the plurality of abutting bodies are distributed around the body 51 of the metal bracket 50, to position the metal bracket 50. In addition, a structure of the abutting body may be a flange, may be an abutting surface, or may be partially a surface and partially a flange.

Figure 9:
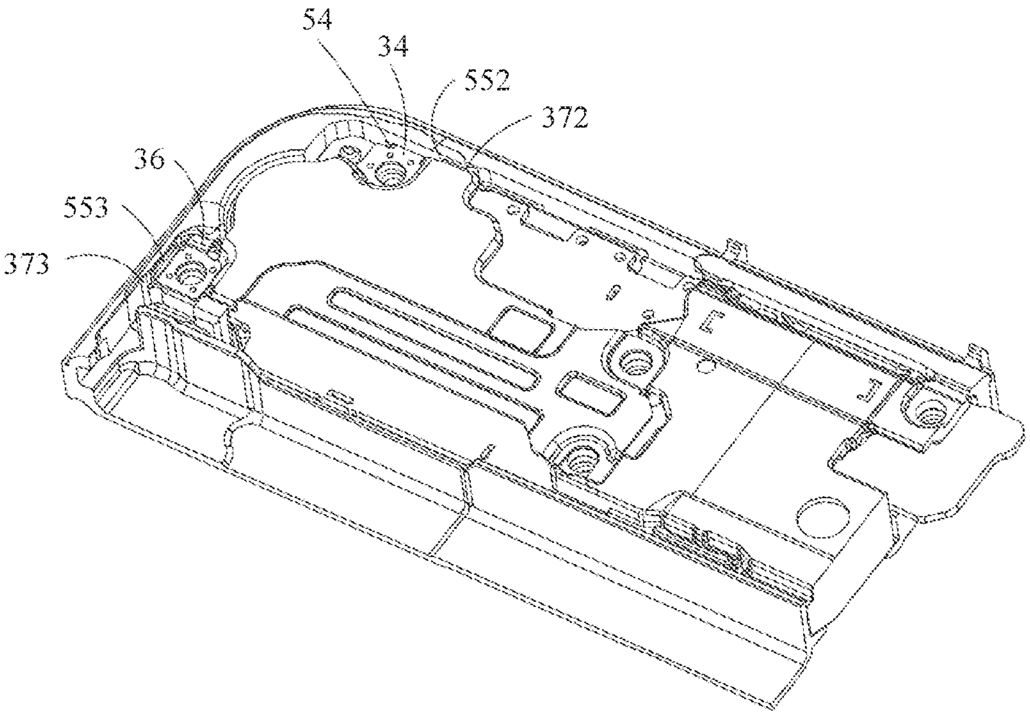
FIG. 9 is an assembly diagram of a middle frame, a sub-board, and a metal bracket.
Figure 10:
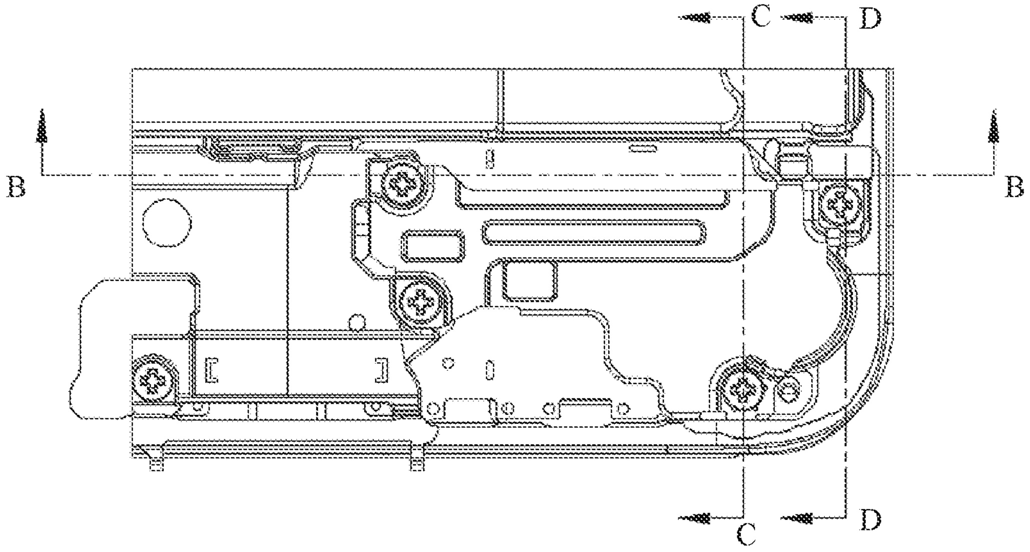
FIG. 10 is a schematic diagram of a plane on which the middle frame, the sub-board, and the metal bracket in FIG. 9 are connected by using screws.
Figure 11:
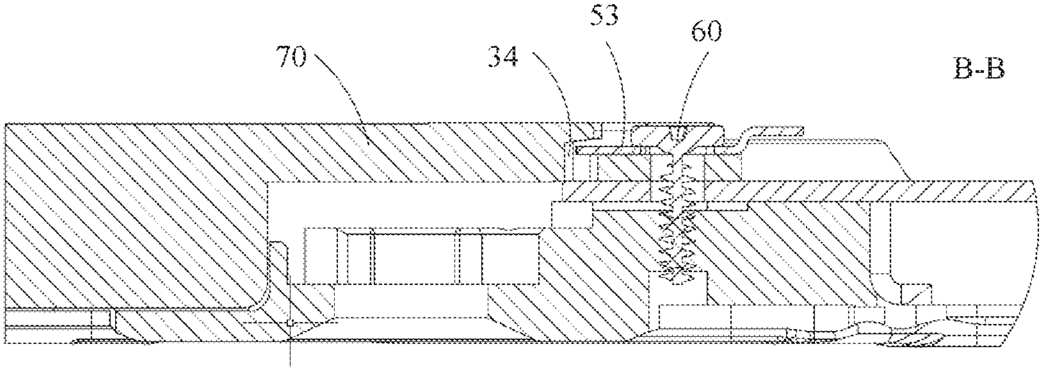
FIG. 11 is a schematic diagram of a cross section of FIG. 10 in a B-B direction.
Figure 12:
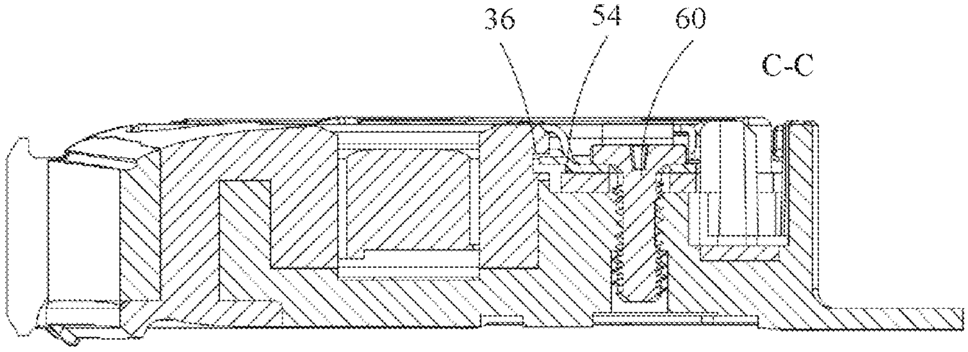
FIG. 12 is a schematic diagram of a cross section of FIG. 10 in a C-C direction.
Figure 13:
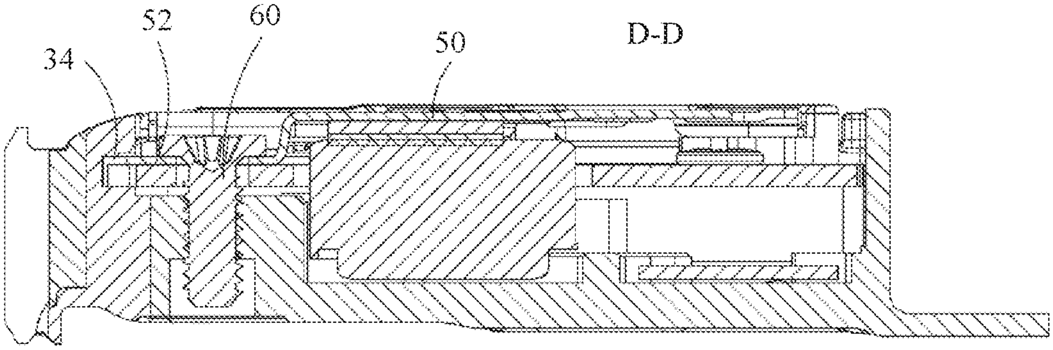
FIG. 13 is a schematic diagram of a cross section of FIG. 10 in a D-D direction.

Refer to FIG. 9, FIG. 10, FIG. 11, FIG. 12, and FIG. 13 together. FIG. 9 is an assembly diagram of a middle frame, a sub-board, and a metal bracket, FIG. 10 is a schematic diagram of a plane on which the middle frame, the sub-board, and the metal bracket are connected by using screws in FIG. 9, FIG. 11 is a schematic diagram of a cross section of FIG. 10 in a B-B direction, FIG. 12 is a schematic diagram of a cross section of FIG. 10 in a C-C direction, and FIG. 13 is a schematic diagram of a cross section of FIG. 10 in a D-D direction.

The sub-board 40 is mounted in the mounting groove 301 of the middle frame 30, and the four positioning holes 41 of the sub-board 40 respectively correspond to the first fastening hole 313, the second fastening hole 314, the third fastening hole 315, and the fourth fastening hole 316. An edge of the sub-board 40 is clamped to the side groove wall of the mounting groove 301. For example, a notch is disposed on a top surface of the side groove wall, and a protruding location is disposed on the sub-board 40. The protruding location is clamped to the notch to implement pre-positioning, to ensure that the four positioning holes 41 are aligned with the first fastening hole 313, the second fastening hole 314, the third fastening hole 315, and the fourth fastening hole 316 in a one-to-one correspondence. The speaker unit 70 is mounted on one side of the mounting groove 301, a part of the outer housing 71 is located above the sub-board 40, and the through hole 711 is aligned with two positioning holes. After the metal bracket 50 is inclined at an angle, the first clamping part 52 and the second clamping part 53 are respectively aligned with the first positioning part 34 and the second positioning part 35, and then the metal bracket 50 is mounted in the mounting groove 301. The body of the mounted metal bracket 50 is parallel to or approximately parallel to the middle plate 31. As shown in FIG. 11, FIG. 12, and FIG. 13, the second clamping part 53 is inserted into the second positioning part 35 in the X-axis direction, the first clamping part 52 is inserted into the first positioning part 34 in the Y-axis direction, and the third clamping part 54 slides to the third positioning part 36 (the third positioning part 36 is a through groove with openings at two ends), to pre-position the metal bracket 50 in the thickness direction of the terminal device, that is, the Z-axis direction (referred to as a third direction). In addition, the plurality of abutting bodies abut against the plurality of abutting parts, to implement pre-positioning of the metal bracket 50 in the X-axis direction (the first direction), that is, pre-positioning in the width direction of the terminal device, and implement pre-positioning of the metal bracket 50 in the Y-axis direction (the second direction), that is, pre-positioning in the length direction of the terminal device. Specifically, the first abutting body 551, the second abutting body 552, the third abutting body 553, the fourth abutting body 554, and the fifth abutting body 555 respectively abut against the first abutting part 371, the second abutting part 372, the third abutting part 373, the fourth abutting part 374, and the fifth abutting part 375, and abutting force is opposite to a direction of the middle of the body 51. In this case, the metal bracket 50 is positioned in three directions: the X-axis direction, the Y-axis direction, and the Z-axis direction, to implement pre-positioning relative to the sub-board 40 and the middle frame 30. The first mounting hole 56, the second mounting hole 57, the third mounting hole 58, and the fourth mounting hole 59 respectively correspond to and communicate with the first fastening hole 313, the second fastening hole 314, the third fastening hole 315, and the fourth fastening hole 316 in a one-to-one correspondence. It may be understood that, the plurality of mounting holes are aligned with the plurality of fastening holes in a one-to-one correspondence. Then, screw locking is performed, that is, a screw passes through threads in the mounting holes, the positioning holes, and the fastening hole to implement screwing, so that the metal bracket 50 and the middle frame 30 fasten the sub-board 40 to the middle frame 30.

In the conventional technology, a bracket mostly uses a solution in which plastic is combined with a steel sheet, where an X-axis direction and a Y-axis direction are limited by using a middle frame, and a Z-axis direction is limited through cooperation between a plastic buckle and a plastic member of the middle frame. However, a disadvantage of the solution in which the plastic is combined with the steel sheet lies in that a strength requirement of the bracket on the plastic member increases a thickness of the plastic member, and therefore relatively large space is occupied in the Z-axis direction. When internal space of a mobile phone is limited, a whole device is inevitably thickened, and an appearance effect is lost. The bracket in this application is manufactured through metal stamping, which reduces a thickness size to a great extent. In addition, the abutting part of the middle frame 30 abuts against the abutting body of the metal bracket 50 to implement positioning in the X-axis direction and the Y-axis direction, and the clamping part of the metal bracket 50 and the positioning part of the middle frame are used to position the Z-axis direction to pre-position the metal bracket. There is no need to use a back adhesive to pre-fasten the metal bracket 50 to the sub-board or a motor through adhering, so as to avoid a case in which the steel bracket cannot be detached and reused because the steel bracket is deformed during maintenance and detachment due to high viscosity of the back adhesive, and avoid a case in which pre-fastening in the Z-axis direction cannot be implemented because the viscosity of the back adhesive is low, thereby preventing an edge of the metal bracket 50 from warping or being displaced relative to the sub-board, causing that a lock screw station cannot be automated.

In an embodiment, each clamping part includes a first surface facing opposite to the middle (opposite to the body) of the metal bracket 50, and each positioning part includes a second surface facing the mounting groove 301. The clamping part is clamped to the positioning part, and the first surface abuts against the second surface, to pre-position the metal bracket 50 in the X-axis direction and the Y-axis direction. For example, a surface that is of the first clamping part 52 and that is opposite to the body 51 is the first surface, and the first positioning part 34 faces the bottom groove wall of the mounting groove 301, that is, a bottom wall parallel to the first side wall surface is the second surface. After the first clamping part 52 is inserted into the first positioning part 34, the first surface abuts against the second surface. An end surface that is of the body on the other side and that is opposite to the first clamping part abuts against the third side wall surface of the mounting groove, so that movement of the metal bracket 50 in the Y-axis direction can be limited, that is, pre-positioning in the Y-axis direction is implemented. Similarly, the second clamping part 53 is clamped to the second positioning part 35, and the first surface of the second clamping part 53 abuts against the second surface of the second positioning part 35, and a side surface of the body abuts against the second side wall surface. Because the first clamping part and the second clamping part are respectively located in the Y-axis direction and the X-axis direction, movement of the metal bracket 50 in the X-axis direction can be limited, that is, pre-positioning in the X-axis direction is implemented.

Figure 14:
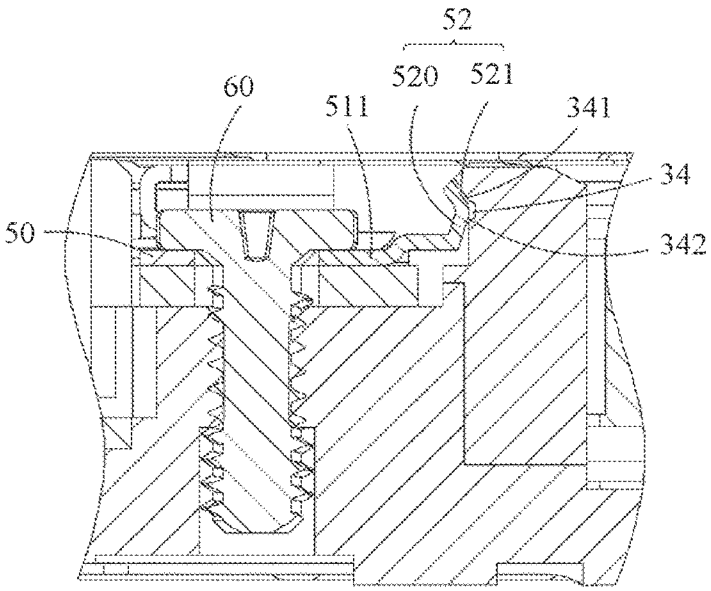
FIG. 14 is a schematic diagram of a cross section of the terminal device shown in FIG. 1 according to another embodiment.

Refer to FIG. 14. FIG. 14 is a schematic diagram of a cross section of the terminal device shown in FIG. 1 according to another embodiment. Unlike the foregoing embodiment, in this embodiment, the structure of the clamping part is in a curved shape, and the fastening part is a groove structure.

Structures of all the clamping parts may be in curved shapes, or the structure of any one of the first clamping part 52, the second clamping part 53, and the third clamping part 54 may be in a curved shape. In this embodiment, the first clamping part 52, the second clamping part 53, and the third clamping part 54 all are formed by bending edge extended sheets of the body 51. In this embodiment, the first clamping part 52 is used as an example. An end that is of the first punching section 511 and that is away from the body 51 is bent towards the Z-axis direction and then bent towards a direction of the body 51, so as to form the first clamping part 52 that substantially has a V-shaped structure. It may be understood that, the extended sheet is bent into a V shape, the first clamping part 52 includes a main body and an abutting end 521, the main body and the abutting end 521 form the V shape at an angle, and the abutting end 521 is a part of the V shape. The first positioning part 34 is a groove, and includes a first side wall 341 and a second side wall 342. The first side wall 341 and the second side wall 342 each form an angle with the first side wall surface 303, and the first side wall 341 and the second side wall 342 are inclined relative to each other, that is, the first side wall 341 is inclined relative to the first side wall surface 303. The metal bracket 50 slides to the first positioning part 34 from the Z-axis mounting groove 303, and the abutting end 521 abuts against the first side wall 341, to pre-position the metal bracket 50 in the Z-axis direction.

Figure 15:
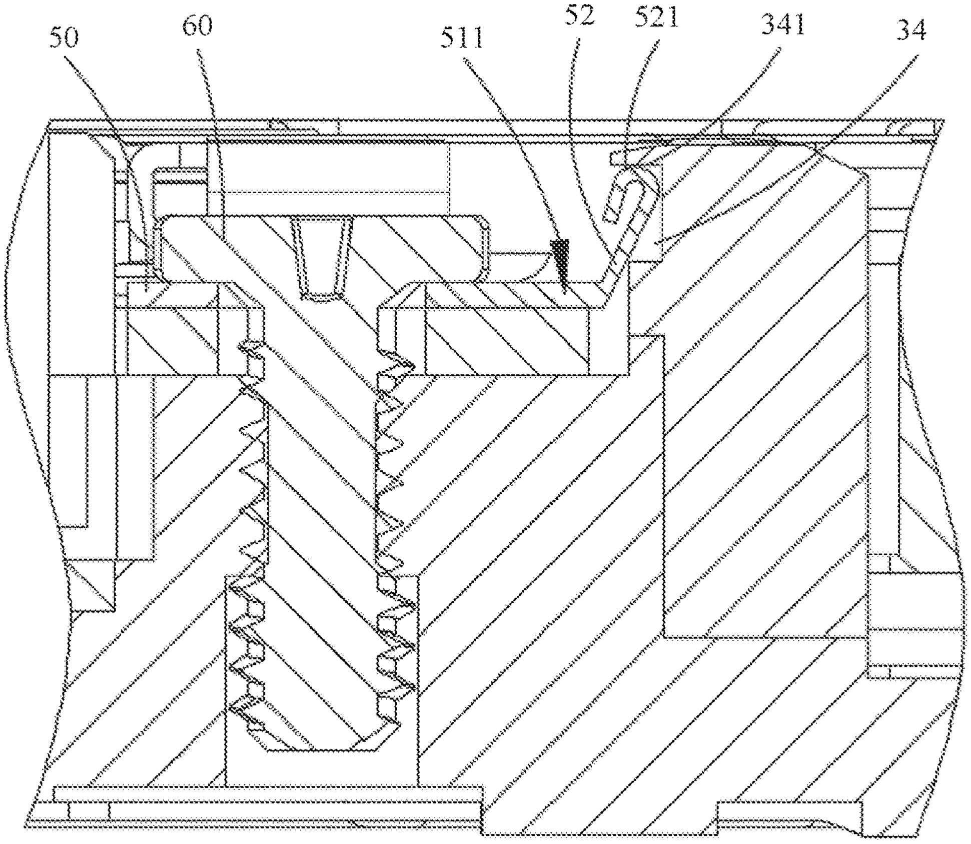
FIG. 15 is a schematic diagram of a cross section of the terminal device shown in FIG. 1 according to still another embodiment.

FIG. 15 is a schematic diagram of a cross section of the terminal device shown in FIG. 1 according to still another embodiment. Unlike the embodiment shown in FIG. 14, in this embodiment, the abutting end 521 of the clamping part is in an arc shape, and the fastening part is a rectangular groove. In this embodiment, the first clamping part 52 is used as an example. The first clamping part 52 includes a body 520 and an abutting end 521. An end that is of the first punching section 511 and that is away from the body 51 is bent by a specific angle (greater than 0 degrees and less than 180 degrees) towards the Z-axis direction to form the body 520. A free end of the body 520 is then bent to form the arc-shaped abutting end 521, and the abutting end 521 is inclined in a direction away from the body 51. It may be understood that the body 520 is a sheet-like body. The first positioning part 34 is a groove, and includes a first side wall 341 and a second side wall 342. Both the first side wall 341 and the second side wall 342 are connected to the first side wall surface 303 at a right angle or substantially at a right angle, and the first side wall 341 and the second side wall 342 are disposed at intervals in the Z-axis direction. After the metal bracket 50 is mounted in the mounting groove 301 from the Z-axis direction, the first clamping part 52 slides to the first positioning part 34 along the first side wall surface 303 and is pushed until being clamped to the first positioning part 34, so that the abutting end 521 abuts against the first side wall 341 and is clamped through resilient force of the abutting end 521, thereby pre-positioning the metal bracket 50 in the Z-axis direction.

The clamping part in the foregoing two embodiments may be directly mounted in the middle frame 30 from the Z-axis direction to be clamped to the fastening part, so as to facilitate mounting of the metal bracket 50 and the middle frame 30. In addition, there is clamping force between the abutting end 521 and the first positioning part 34, which can ensure clamping between the first clamping part 52 and the first positioning part 34, thereby further improving pre-positioning accuracy of the metal bracket 50 in the Z-axis direction.

In some other embodiments, unlike the embodiment shown in FIG. 15, the first clamping part 52 includes a body 520 and an abutting end 521. The body 520 is an S-shaped sheet body, and the abutting end 521 is an arc-shaped top location of the body 520. In this embodiment, there is elastic abutting force between the abutting end 521 of the first clamping part 52 and the first positioning part 34 in the Z-axis direction, so as to ensure clamping between the first clamping part 52 and the first positioning part 34, thereby improving pre-positioning accuracy. In both this embodiment and the embodiment in FIG. 15, the arc-shaped abutting end 521 abuts against a surface, that is, a point is in contact with a surface, to implement positioning in the Z-axis direction.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Embodiments of this application and features in the embodiments may be combined with each other when no conflict occurs. Therefore, the protection scope of this application shall be subject to the protection scope of the claims.

What is claimed is:

1. A terminal device, comprising:

a housing comprising a plurality of fastening holes and a plurality of positioning parts;

a circuit board assembly comprising a printed circuit board, wherein the printed circuit board comprises a plurality of positioning holes;

a metal bracket comprising a plurality of clamping parts and a plurality of mounting holes; and a plurality of fastening parts;

wherein the plurality of clamping parts are distributed at intervals on a periphery of the metal bracket, the plurality of clamping parts are in a one-to-one correspondence with the plurality of positioning parts, and the plurality of fastening holes are in a one-to-one correspondence with the plurality of positioning holes and the plurality of mounting holes;

wherein the printed circuit board and the metal bracket are disposed on the housing, the printed circuit board is located between the metal bracket and the housing, the plurality of clamping parts are clamped to the plurality of positioning parts in a one-to-one correspondence in a thickness direction of the terminal device, the plurality of fastening holes are respectively aligned with the plurality of positioning holes in a one-to-one correspondence in the thickness direction of the terminal device, and the plurality of positioning holes are respectively aligned with the plurality of mounting holes in a one-to-one correspondence in the thickness direction of the terminal device;

wherein the each fastening part of the plurality of fastening parts sequentially passes through an aligned mounting hole, positioning hole, and fastening hole that are in a one-to-one correspondence, to fasten the metal bracket, the printed circuit board, and the housing in the thickness direction of the terminal device;

wherein the metal bracket comprises a body, wherein the plurality of clamping parts comprises a first clamping part, a second clamping part, and a third clamping part that are disposed on the body, and wherein the first clamping part, the second clamping part, and the third clamping part are respectively located at three corner locations of the body and each of the first clamping part, the second clamping part, and the third clamping part extends away from the body;

wherein the plurality of positioning parts comprises a first positioning part, a second positioning part, and a third positioning part, wherein the first clamping part is clamped to the first positioning part. the second clamping part is clamped to the second positioning part, and the third clamping part is clamped to the third positioning part; and wherein the third positioning part and the first positioning part are disposed in a staggered manner in a length direction of the terminal device, and the third positioning part and the second positioning part are disposed in a staggered manner in a width direction of the terminal device.

2. The terminal device according to claim 1, wherein the housing further comprises a mounting groove, and a notch is disposed on a top surface of a side groove wall of the mounting groove;

wherein the printed circuit board comprises a protruding location, the protruding location is disposed on an edge of the printed circuit board, the printed circuit board is sequentially mounted in the mounting groove along the thickness direction of the terminal device, and the protruding location is clamped to the notch.

3. The terminal device according to claim 1, wherein the circuit board assembly comprises a primary circuit board and a secondary circuit board, and the secondary circuit board is the printed circuit board.

4. A terminal device, comprising:

a housing comprising a plurality of fastening holes and a plurality of positioning parts;

a circuit board assembly comprising a printed circuit board, wherein the printed circuit board comprises a plurality of positioning holes;

a metal bracket comprising a plurality of clamping parts and a plurality of mounting holes; and a plurality of fastening parts;

wherein the plurality of clamping parts are distributed at intervals on a periphery of the metal bracket, the plurality of clamping parts are in a one-to-one correspondence with the plurality of positioning parts, and the plurality of fastening holes are in a one-to-one correspondence with the plurality of positioning holes and the plurality of mounting holes;

wherein the printed circuit board and the metal bracket are disposed on the housing, the printed circuit board is located between the metal bracket and the housing, the plurality of clamping parts are clamped to the plurality of positioning parts in a one-to-one correspondence in a thickness direction of the terminal device, the plurality of fastening holes are respectively aligned with the plurality of positioning holes in a one-to-one correspondence in the thickness direction of the terminal device, and the plurality of positioning holes are respectively aligned with the plurality of mounting holes in a one-to-one correspondence in the thickness direction of the terminal device;

wherein the each fastening part of the plurality of fastening parts sequentially passes through an aligned mounting hole, positioning hole, and fastening hole that are in a one-to-one correspondence, to fasten the metal bracket, the printed circuit board, and the housing in the thickness direction of the terminal device;

wherein the housing further comprises a mounting groove and a plurality of abutting parts, and the plurality of abutting parts are disposed at intervals along peripheral side wall surfaces of the mounting groove;

wherein the metal bracket comprises a plurality of abutting bodies that are in a one-to-one correspondence with the plurality of abutting parts, the plurality of abutting bodies are disposed along the periphery of the metal bracket, and one abutting body is disposed on a side part of each clamping part; and wherein the printed circuit board and the metal bracket are sequentially mounted in the mounting groove in the thickness direction of the terminal device, and each abutting body abuts against an abutting part corresponding to the abutting body, to pre-position the metal bracket and the housing in a width direction of the terminal device and a length direction of the terminal device.

5. The terminal device according to claim 4, wherein the mounting groove comprises a side wall surface, the positioning part is a groove recessed on the side wall surface, and a groove opening of the groove is located on the side wall surface; and wherein the metal bracket comprises a body, and the clamping part is an extended sheet that is located at an edge of the body and that extends away from the body.

6. The terminal device according to claim 5, wherein the groove comprises a first side wall and a second side wall, and the first side wall and the second side wall are disposed parallel and opposite to each other;

wherein the clamping part comprises a main body and an abutting end, the main body is located at the edge of the body and is bent and extends in the thickness direction of the terminal device, a free end of the main body is bent to form the abutting end in an arc shape, and the abutting end is inclined away from the body direction; and wherein the metal bracket is mounted in the mounting groove in the thickness direction of the terminal device, the clamping part slides along the side wall surface to be inserted in the positioning part, and an arc-shaped surface of the abutting end abuts against the first side wall in the thickness direction of the terminal device.

7. The terminal device according to claim 5, wherein the housing comprises a middle frame and an outer housing of an electronic component, the outer housing of the electronic component is mounted in the mounting groove, the mounting groove is disposed on the middle frame, and the mounting groove comprises a first side wall surface; and wherein the plurality of positioning parts comprise a first positioning part and a second positioning part; the first positioning part is disposed on the first side wall surface, and a groove opening of the first positioning part faces the length direction of the terminal device; the second positioning part is disposed on a surface that is of the outer housing and that faces inwards the mounting groove, and a groove opening of the second positioning part faces the width direction of the terminal device; and the surface that is of the outer housing and that faces inwards the mounting groove is connected to the first side wall surface.

8. The terminal device according to claim 5, wherein the plurality of positioning parts comprise a third positioning part, and the third positioning part and the second positioning part are disposed in a staggered manner in the width direction of the terminal device;

wherein the mounting groove comprises a second side wall surface, and the second side wall surface is connected to the first side wall surface and is disposed opposite to the surface that is of the outer housing and that faces inwards the mounting groove; and wherein an arc-shaped convex part is disposed on the second side wall surface, the third positioning part is disposed on an arc-shaped surface of the convex part, the third positioning part comprises a groove opening located on the arc-shaped surface and end openings located on surfaces on two opposite sides of the groove opening, the groove opening faces the length direction of the terminal device, and the two end openings are arranged in the width direction of the terminal device.

9. The terminal device according to claim 8, wherein a first punching section, a second punching section, a third punching section, and a fourth punching section are disposed on the body, and the plurality of clamping parts comprises a first clamping part, a second clamping part, and a third clamping part;

wherein the first clamping part is clamped to the first positioning part, the second clamping part is clamped to the second positioning part, and the third clamping part is clamped to the third positioning part; and wherein the first punching section, the second punching section, the third punching section, and the fourth punching section are located at edges of four corner locations of the body that are disposed at intervals, the first clamping part extends from an edge of the first punching section to the length direction of the terminal device, the second clamping part extends from an edge of the second punching section to the width direction of the terminal device, and the third clamping part extends from an edge of the third punching section to the length direction of the terminal device.

10. The terminal device according to claim 9, wherein the plurality of mounting holes comprises a first mounting hole, a second mounting hole, a third mounting hole, and a fourth mounting hole, and the first mounting hole, the second mounting hole, the third mounting hole, and the fourth mounting hole are respectively provided on and penetrate through the first punching section, the second punching section, the third punching section, and the fourth punching section in the thickness direction of the terminal device.

11. The terminal device according to claim 5, wherein the groove comprises a first side wall and a second side wall, both the first side wall and the second side wall face inwards the mounting groove, and the first side wall is connected to the side wall surface and inclined relative to the side wall surface; and wherein the clamping part comprises a main body and an abutting end, the main body and the abutting end are connected at an angle, the abutting end is inclined in the body direction, the metal bracket is mounted in the mounting groove in the thickness direction of the terminal device, the clamping part slides along the side wall surface to be inserted in the positioning part, and the abutting end abuts against the first side wall in the thickness direction of the terminal device.

12. The terminal device according to claim 4, wherein the plurality of abutting bodies comprises a first abutting body, a second abutting body, a third abutting body, and a fourth abutting body;

wherein the plurality of clamping parts comprises a first clamping part, a second clamping part, and a third clamping part;

wherein the first abutting body is disposed adjacent to the first clamping part, the second abutting body is disposed adjacent to the second clamping part, the third abutting body is disposed adjacent to the third clamping part, and the fourth abutting body is disposed adjacent to the second abutting body; and wherein the first abutting body and the second abutting body abut against in the length direction of the terminal device, the abutting parts corresponding to the first abutting body and the second abutting body, and the third abutting body and the fourth abutting body abut against, in the width direction of the terminal device, the abutting parts corresponding to the third abutting body and the fourth abutting body.

13. The terminal device according to claim 12, wherein the plurality of abutting bodies are flange structures or end surfaces at edges of the metal bracket.

14. A terminal device, comprising:

a housing comprising a plurality of fastening holes and a plurality of positioning parts;

a circuit board assembly comprising a printed circuit board, wherein the printed circuit board comprises a plurality of positioning holes;

a metal bracket comprising a plurality of clamping parts and a plurality of mounting holes; and a plurality of fastening parts;

wherein the plurality of clamping parts are distributed at intervals on a periphery of the metal bracket, the plurality of clamping parts are in a one-to-one correspondence with the plurality of positioning parts, and the plurality of fastening holes are in a one-to-one correspondence with the plurality of positioning holes and the plurality of mounting holes;

wherein the printed circuit board and the metal bracket are disposed on the housing, the printed circuit board is located between the metal bracket and the housing, the plurality of clamping parts are clamped to the plurality of positioning parts in a one-to-one correspondence in a thickness direction of the terminal device, the plurality of fastening holes are respectively aligned with the plurality of positioning holes in a one-to-one correspondence in the thickness direction of the terminal device, and the plurality of positioning holes are respectively aligned with the plurality of mounting holes in a one-to-one correspondence in the thickness direction of the terminal device;

wherein the each fastening part of the plurality of fastening parts sequentially passes through an aligned mounting hole, positioning hole, and fastening hole that are in a one-to-one correspondence. to fasten the metal bracket, the printed circuit board, and the housing in the thickness direction of the terminal device;

wherein the housing further comprises a mounting groove, each clamping part of the plurality of clamping parts comprises a first surface facing opposite to the middle of the metal bracket, and each positioning part of the plurality of positioning parts comprises a second surface facing the mounting groove;

wherein each clamping part of the plurality of clamping parts is clamped to a positioning part of the plurality of positioning parts in a one-to-one correspondence; and wherein for each clamping part clamped to a positioning part, the first surface of the clamping part abuts against the second surface of the positioning part, to preposition the metal bracket and the housing in a width direction of the terminal device and the thickness direction of the terminal device.

15. The terminal device according to claim 14, wherein the metal bracket comprises a body, each clamping part of the plurality of clamping parts comprises a first clamping part and a second clamping part that are disposed on the body, and the positioning parts comprise a first positioning part and a second positioning part;

wherein a surface of the first clamping part facing opposite to the body is a first surface, a surface of the first positioning part facing a bottom groove wall of the mounting groove is a second surface, the first clamping part is clamped to the first positioning part, and the first surface abuts against the second surface; and wherein an end surface that is of the body on another side and that is opposite to the first clamping part abuts against a side wall surface of the mounting groove.

16. The terminal device according to claim 15, wherein the clamping parts comprise the second clamping part disposed on the body, the positioning parts comprise the second positioning part, a surface of the second clamping part facing opposite to the body is a first surface, a surface of the second positioning part facing the bottom groove wall of the mounting groove is a second surface, the second clamping part is clamped to the second positioning part, and the first surface of the second clamping part abuts against the second surface of the second positioning part; and the first clamping part and the second clamping part are respectively located in a length direction and the width direction of the terminal device.

* * * * *